United States Patent
Huffman

(10) Patent No.: US 7,458,368 B1
(45) Date of Patent: Dec. 2, 2008

(54) ENGINE FUEL EFFICIENCY IMPROVEMENTS

(76) Inventor: Daniel Huffman, 202 CR 1418, Quitman, TX (US) 75783

( * ) Notice: Subject to any disclaimer, the term of this patent is extended or adjusted under 35 U.S.C. 154(b) by 0 days.

(21) Appl. No.: 11/737,062

(22) Filed: Apr. 18, 2007

(51) Int. Cl.
F02M 21/00 (2006.01)
B60K 15/10 (2006.01)
C25C 1/00 (2006.01)

(52) U.S. Cl. .................. 123/525; 180/69.4; 205/628

(58) Field of Classification Search .......... 123/3, 123/1 A, 525, 703, 557, DIG. 12; 180/69.4; 205/628

See application file for complete search history.

(56) References Cited

U.S. PATENT DOCUMENTS

| | | | | |
|---|---|---|---|---|
| 3,648,668 A | * | 3/1972 | Pacheco | 123/3 |
| 4,111,160 A | * | 9/1978 | Talenti | 123/1 A |
| 4,168,685 A | * | 9/1979 | Little et al. | 123/575 |
| 5,355,672 A | * | 10/1994 | Adamczyk et al. | 60/274 |

* cited by examiner

Primary Examiner—Stephen K Cronin
Assistant Examiner—Ka Chun Leung
(74) Attorney, Agent, or Firm—Quick Patents, Inc.; Kevin Prince

(57) ABSTRACT

The present invention is a system for increasing the fuel efficiency of a vehicle of the type having an internal combustion engine, a battery, a vacuum line, and a fuel line that feeds fuel to the engine. The system comprises a hydrogen gas generator and a vacuum regulator. A vacuum regulator is in fluid communication with the vacuum line of the vehicle and an output line of the gas generator. The vacuum regulator includes a vacuum pressure adjustment means for controlling the amount of hydrogen gas that is introduced into the vacuum line of the vehicle. In use, hydrogen gas is introduced into the vehicle vacuum line and then into the engine where it is mixed with the fuel from the fuel line and ambient air. The hydrogen gas increases the atomization of the fuel for more efficient burning thereof in the engine. A fuel additive including an acetone-based compound, a xylene-based compound, and an upper cylinder lubricant may be mixed with the hydrogen gas to further atomize the fuel. An oxygen sensor signal generator that generates a bypass signal replicates the output of a vehicle oxygen sensor under normal operating conductions to keep the air mixture of the engine unaffected. The system may additional include at least one fuel heating means fixed to a high-temperature portion of the engine, such that the fuel is heated before being introduced into the engine so as to further increase atomization of the fuel for more efficient burning thereof in the engine.

8 Claims, 3 Drawing Sheets

ENGINE FUEL EFFICIENCY IMPROVEMENTS

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to internal combustion engines, and more particularly to a system for increasing the fuel efficiency of such engines.

DISCUSSION OF RELATED ART

In an internal combustion engine, the finer the fuel droplet size that is introduced into the combustion chamber the more evenly and thoroughly the fuel is burned, leading to increased fuel efficiency, greater engine power, and fewer harmful exhaust emissions. As such, it is desirable to finely atomize the fuel by the time it gets to the combustion chamber within each cylinder of the engine. Carburetors and fuel injection systems go a long way towards accomplishing this, but such fuel regulation systems can only atomize a liquid fuel so far.

It is known that reducing the surface tension of a liquid fuel will result in its being able to form smaller droplets and being more finely atomized. Further, adding hydrogen and oxygen gas within an engine combustion chamber sets-up the reaction $2H_2+O_2 \rightarrow H_2O$, which releases further energy during the burning phase of the cylinder. Hydrogen gas, particularly mixed with acetone and xylene, significantly reduces the surface tension in fuel such as gasoline, enabling the fuel to be finely atomized.

When introducing hydrogen gas into an air intake of a typical vehicle engine, particularly those equipped with oxygen sensors that drive a vehicle electronic computing unit (ECU) that calculates optimal fuel/air mixtures, the ECU detects a change in the exhaust gas constituents and causes the fuel air mixture to drastically lower the amount of air in the mixture, which minimizes the advantageous effect of adding hydrogen to the air intake.

Therefore, there is a need for an inexpensive system for providing hydrogen gas into the fuel/air mixture before being introduced into a standard internal combustion engine. Such a needed system would require few additional parts, and would be relatively easily added to existing vehicles. Further, such a system would provide means for bypassing any engine oxygen sensors so as to maintain an effective fuel/air mixture ratio while such a system is in use. Still further, such a system would provide means of pre-heating fuel to further help atomize the fuel. The present invention accomplishes these objectives.

SUMMARY OF THE INVENTION

The present invention is a system for increasing the fuel efficiency of a vehicle of the type having an internal combustion engine, a battery, a vacuum line, and a fuel line that feeds fuel to the engine. The system comprises a hydrogen gas generator that generates hydrogen gas and discharges such gas through a hydrogen gas output line thereof. Preferably the hydrogen gas generator is electrically powered and electrically interconnected to the battery of the vehicle. Further, the hydrogen gas generator preferably includes a hydrogen peroxide reservoir having an electric anode and an electric cathode for causing hydrogen peroxide to be converted into hydrogen gas and oxygen gas, as is known in the art.

A vacuum regulator is in fluid communication with the vacuum line of the vehicle and the hydrogen gas output line. The vacuum regulator includes a vacuum pressure adjustment means for controlling the amount of hydrogen gas that is introduced into the vacuum line of the vehicle.

In use, hydrogen gas is introduced into the vehicle vacuum line and then into the engine where it is mixed with the fuel from the fuel line and ambient air. The hydrogen gas increases the atomization of the fuel for more efficient burning thereof in the engine. The hydrogen gas further at least partially reacts with the oxygen gas in an exothermic reaction that produces water vapor and additional energy, recovering a portion of the energy required to run the hydrogen gas generator.

The system preferably further includes an additive reservoir that contains a fuel additive which is discharged from the reservoir through an additive output line which is in fluid communication with the vacuum regulator. The vacuum regulator mixes the fuel additive with the hydrogen gas, and includes an additive valve that has an adjustment means for controlling the amount of fuel additive that is introduced into the vacuum line. The fuel additive increases atomization of the fuel for more efficient burning thereof in the engine. Preferably the fuel additive includes an acetone-based compound, a xylene-based compound, and an upper cylinder lubricant.

Many vehicles have an oxygen sensor that is electrically connected to an engine electronic computing unit (ECU), which adjusts a fuel and air mixture that enters the engine for burning. With such vehicles, the system may further include an oxygen sensor signal generator that comprises a circuit for generating an oxygen sensor bypass signal. The circuit is electrically connected to the battery and the ECU in place of the oxygen sensor. The oxygen sensor bypass signal replicates the output of the oxygen sensor under normal operating conductions, and as such the fuel and air mixture set by the ECU is not affected by changing the resulting oxygen levels in engine exhaust caused by the addition of the hydrogen gas, oxygen gas, and fuel additive.

The system may additional include at least one fuel heating means fixed to a high-temperature portion of the engine, such that the fuel is heated before being introduced into the engine so as to further increase atomization of the fuel for more efficient burning thereof in the engine.

The present invention is an inexpensive system for introducing hydrogen gas into a vehicle's fuel/air mixture before being introduced into the vehicle's internal combustion engine. The present device requires few additional parts, and is relatively easily added to existing vehicles. Further, the present system provides means for bypassing any engine oxygen sensors so as to cause an effective fuel/air mixture ratio to be maintained while the system is in use. Still further, the present invention provides means of pre-heating fuel to further help atomize the fuel. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
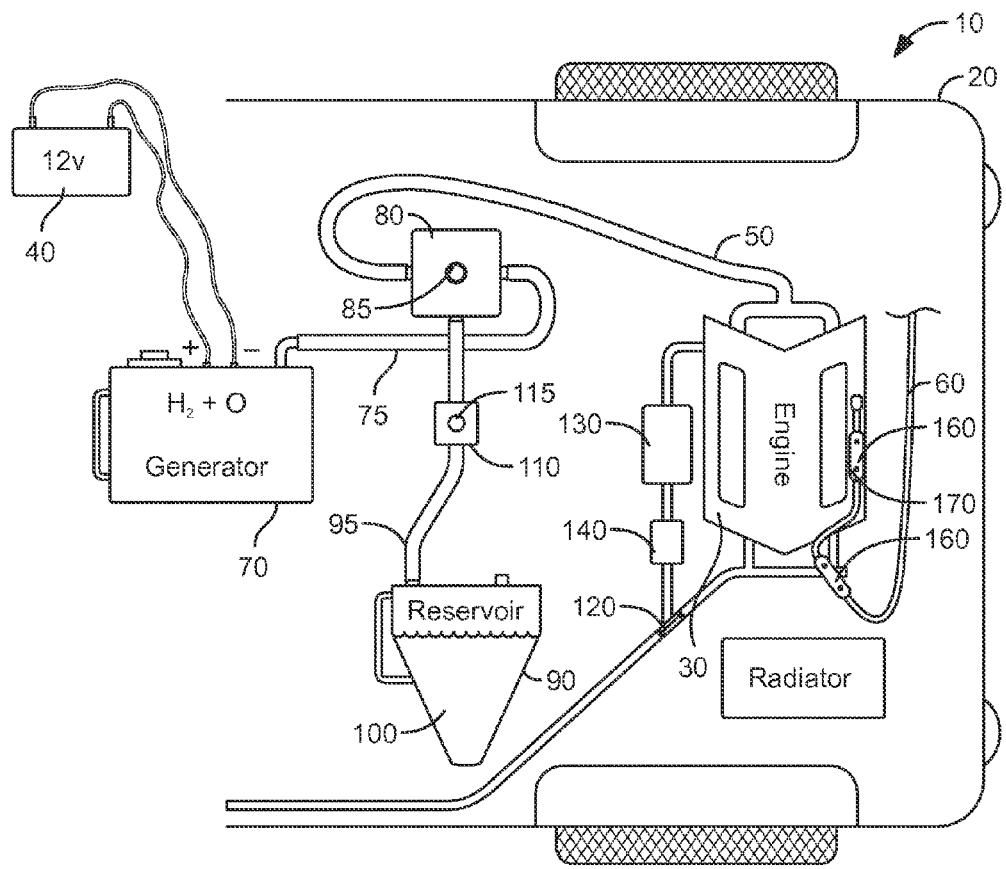
FIG. 1 is a diagram of the system of the present invention.

The present invention, illustrated in FIG. 1, is a system 10 for increasing the fuel efficiency of a vehicle 20 of the type having an internal combustion engine 30, a battery 40, a vacuum line 50, and a fuel line 60 that feeds fuel 65 to the engine 30. It is known that the more finely the fuel 65 entering the engine 30 to be burned is atomized, the more thoroughly the fuel 65 is burned and the more energy is released, increasing fuel efficiency.

Figure 2:
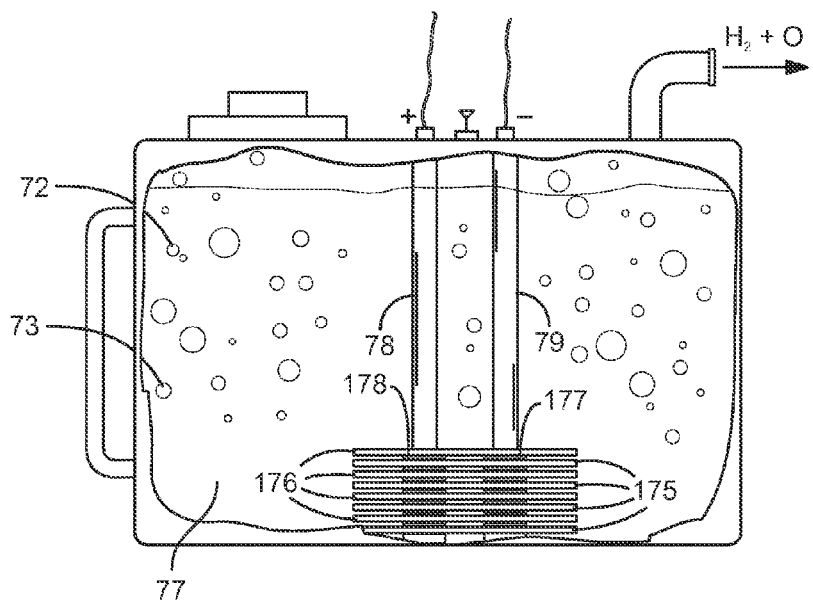
FIG. 2 is a diagram of a hydrogen gas generator of the invention.

The system 10 comprises a hydrogen gas generator 70 (FIG. 2) that generates hydrogen gas 72 and discharges the gas 72 through a hydrogen gas output line 75 thereof. Preferably the hydrogen gas generator 70 is electrically powered and electrically interconnected to the battery 40 of the vehicle 20. Further, the hydrogen gas generator 70 preferably includes a hydrogen peroxide reservoir 77 having an electric anode 78, such as a stainless steel rod, and an electric cathode 79, such as a stainless steel rod, for causing hydrogen peroxide 71 to be converted into hydrogen gas 72 and oxygen gas 73, as is known in the art. The hydrogen gas generator 70 includes stainless steel carbon injected plates 175 stacked between stainless steel plates 176 that are each separated by plastic washers 177 on a negatively-charged side, and stainless steel washers 178 on a positively-charged side.

A vacuum regulator 80 is in fluid communication with the vacuum line 50 of the vehicle 20 and the hydrogen gas output line 75. The vacuum regulator 80 includes a vacuum pressure adjustment means 85, such as a valve 85, for controlling the amount of hydrogen gas 72 that is introduced into the vacuum line 50 of the vehicle 20.

In use, hydrogen gas 72 is introduced into the vehicle vacuum line 50 and then into the engine 30 where it is mixed with the fuel 65 from the fuel line 60 and ambient air. The hydrogen gas 72 increases the atomization of the fuel 65 for more efficient burning thereof in the engine 30. The hydrogen gas 72 further at least partially reacts with the oxygen gas 73 in an exothermic reaction that produces water vapor and additional energy.

Figure 4:
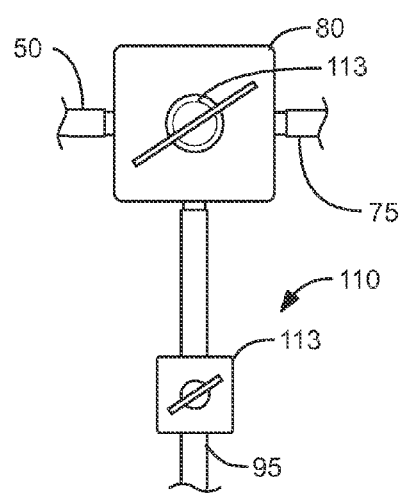
FIG. 4 is a partial view of a vacuum regulator of the invention.

The system 10 preferably further includes an additive reservoir 90, such as a chemically inert plastic container, that contains a fuel additive 100. The additive 100 is discharged from the reservoir 90 through an additive output line 95 which is in fluid communication with the vacuum regulator 80. The vacuum regulator 80 mixes the fuel additive 100 with the hydrogen gas 72, and includes an additive valve 110 that has an adjustment means 115 for controlling the amount of fuel additive 100 that is introduced into the vacuum line 50. The fuel additive 100 increases atomization of the fuel 65 for more efficient burning thereof in the engine 30. Preferably the additive valve 110 is an adjustable ball valve 113 (FIG. 4).

Preferably the fuel additive 100 includes an acetone-based compound, a xylene-based compound, and an upper cylinder lubricant, preferably in equal amounts by volume. Acetone and xylene both help to reduce the surface tension in the fuel 65 such that finer droplets of fuel 65 are generated, which improved fuel efficiency. The lubricant is used to help further lubricate the engine 30.

Figure 5:
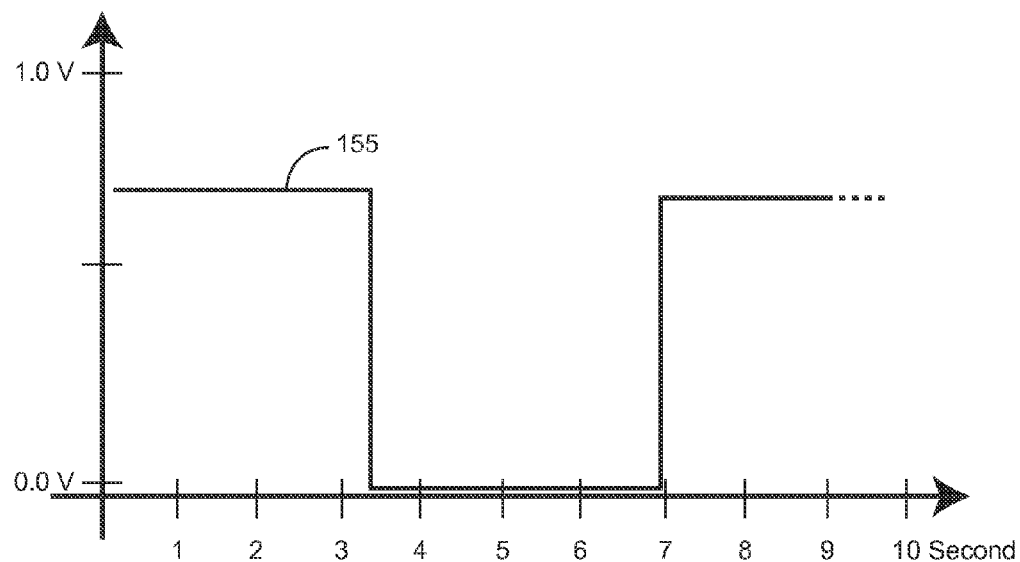
FIG. 5 is a graph illustrating an oxygen sensor bypass signal generated by the signal generator of the invention when the vehicle is not in motion.
Figure 6:
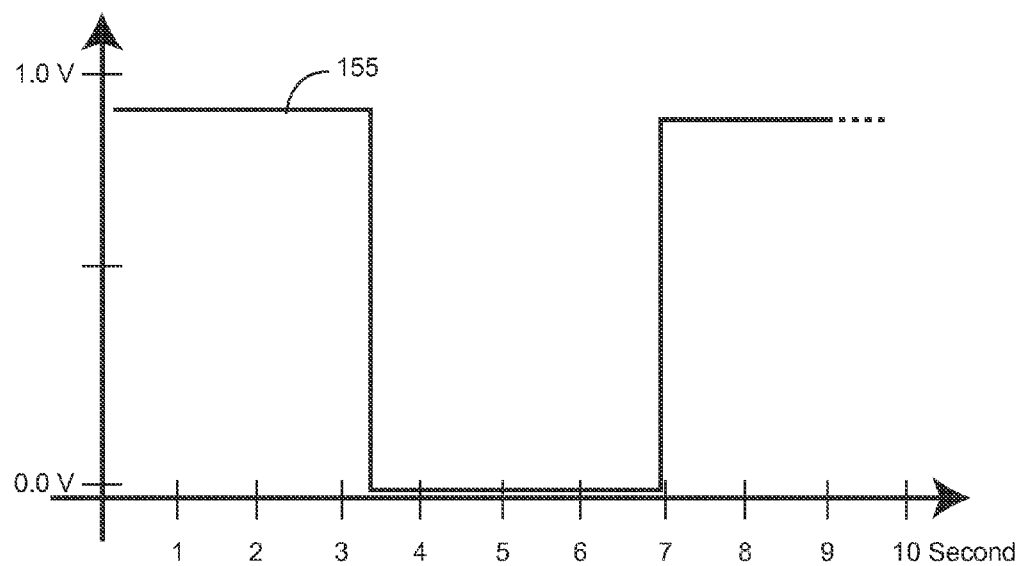
FIG. 6 is a graph illustrating an oxygen sensor bypass signal generated by the signal generator of the invention when the vehicle is in motion.

Many vehicles 20 have an oxygen sensor 120 that is electrically connected to an engine electronic computing unit 130 (ECU), which adjusts a fuel and air mixture that enters the engine 30 for burning. With such vehicles 20, the system 10 may further include an oxygen sensor signal generator 140 (FIG. 3) that comprises a circuit 150 for generating an oxygen sensor bypass signal 155 (FIGS. 5 and 6). The circuit 150 is electrically connected to the battery 40 and the ECU 130 in place of the oxygen sensor 120. The oxygen sensor bypass signal 155 replicates the output of the oxygen sensor 120 under normal operating conductions, and as such the fuel and air mixture set by the ECU 130 is not affected by changing the resulting oxygen levels in engine exhaust caused by the addition of the hydrogen gas 172, oxygen gas 173, and fuel additive 100. Preferably the oxygen sensor bypass signal oscillates between about 0.0 volts and about 0.7 volts every 3 to 4 seconds when the vehicle 20 is not in motion, and between about 0.0 volts and about 0.9 volts every 3 to 4 seconds when the vehicle 20 is in motion, as illustrated in FIGS. 5 and 6, which is the typical output of most such sensors 120.

Figure 3:
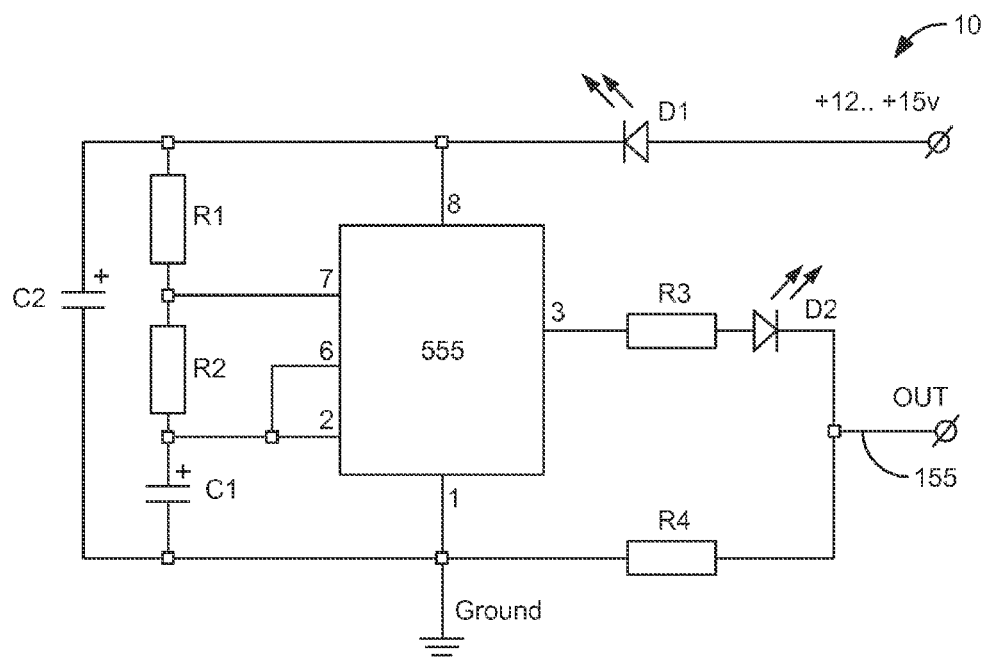
FIG. 3 is an electrical schematic of signal generator of the invention.

To generate such an oxygen sensor bypass signal 155, electrical components shown in FIG. 3 may be as indicated in the following table:

| Component | Value |
| --- | --- |
| R1 | 100 KΩ |
| R2 | 1 MΩ |
| R3 | 100 KΩ |
| R4 | 10 KΩ |
| C1 | 4.7 μF |
| C2 | 22 μF |
| D1 | 1.7 v @ 20 mA LED |
| D2 | 1.7 v @ 20 mA LED |
| 555 | 555 programmable timer |

Preferably R2 and R4 are adjustable resistors so that the oxygen sensor bypass signal 155 may be adjusted until it has the proper signal characteristics, as shown approximately in FIGS. 5 and 6. D1 is illuminated when the battery 40 is connected to the circuit 150, and D2 is illuminated when the oxygen sensor bypass signal 155 is significantly above 0.0 volts.

The system 10 may additional include at least one fuel heating means 160 fixed to a high-temperature portion 170 of the engine 30, such that the fuel 65 is heated before being introduced into the engine 30 so as to further increase atomization of the fuel 65 for more efficient burning thereof in the engine 30. Such a fuel heating means 160 may be an aluminum warmer that has a carbon, neoprene, or burlap cloth filters to further help finely atomize the fuel 65. Such high-temperature portions 170 of the engine 30 may be adjacent to radiator hot water hoses, engine manifolds, or the like (FIG. 1). The fuel heating means 160 may also include magnets (not shown) to align the atoms of gasoline for easier vaporization, as is known in the art.

While a particular form of the invention has been illustrated and described, it will be apparent that various modifications can be made without departing from the spirit and scope of the invention. For example, the exact mixture of the fuel additive 100 may be varied in any number of ways, such as by changing the relative percentages of the acetone-based compound, the xylene-based compound, and the upper cylinder lubricant. Further, additional fuel heating means 160 may be included at other locations along the fuel line 60. Accordingly, it is not intended that the invention be limited, except as by the appended claims.

What is claimed is:

1. A system for increasing the fuel efficiency of a vehicle of the type having an internal combustion engine, a battery, a vacuum line, and a fuel line that feeds fuel to the engine, the system comprising:
    a hydrogen gas generator that generates hydrogen gas and discharges the gas through a hydrogen gas output line thereof,
    a vacuum regulator in fluid communication with the vacuum line of the vehicle and the hydrogen gas output line, the vacuum regulator including a vacuum pressure adjustment means for controlling the amount of hydrogen gas that is introduced into the vacuum line,
    whereby the hydrogen gas is introduced into the vehicle vacuum line and then into the engine and mixed with the fuel from the fuel line, the hydrogen gas increasing atomization of the fuel for more efficient burning thereof in the engine,
    a fuel additive reservoir containing a fuel additive and having a fuel additive output line for discharging said fuel additive therethrough, wherein said fuel additive output line is in fluid communication with the vacuum regulator, wherein said vacuum regulator mixes said fuel additive with said hydrogen gas,
    wherein said vacuum regulator has an additive valve, said additive valve having adjustment means for controlling the amount of fuel additive that is introduced into said vacuum line, whereby a hydrogen gas and fuel additive mixture is introduced into the engine, and wherein said fuel additive increases the atomization of the fuel for more efficient burning thereof in the engine,
    wherein the vehicle further has an oxygen sensor electrically connected to an engine electronic computing unit, said engine electronic computing unit having means for adjusting a fuel and air mixture entering the engine,
    the system further comprising an oxygen sensor signal generator comprising a circuit for generating an oxygen sensor bypass signal,
    wherein said circuit for generating an oxygen sensor bypass signal is electrically connected to the battery and the electronic computing unit in place of said oxygen sensor,
    wherein said oxygen sensor bypass signal replicates an output signal of said oxygen sensor under standard operating conditions,
    whereby said fuel and air mixture is not affected by any changed oxygen levels in engine exhaust caused by the hydrogen gas, and
    at least one fuel heating means fixed to a high-temperature portion of the engine, such that fuel is heated before being introduced into the engine so as to further increase atomization of the fuel for more efficient burning thereof in the engine.

2. The system of claim 1 wherein the hydrogen gas generator is electrically powered and electrically interconnected to the battery of the vehicle.

3. The system of claim 2 wherein the hydrogen gas generator includes a water reservoir having an electric anode and an electric cathode for causing water to be converted into hydrogen gas and oxygen gas.

4. The system of claim 1 wherein the fuel additive includes an acetone-based compound.

5. The system of claim 1 wherein the fuel additive includes a xylene-based compound.

6. The system of claim 1 wherein the fuel additive includes an upper cylinder lubricant.

7. The system of claim 1 wherein the additive valve is an adjustable ball valve.

8. The system of claim 1 wherein the oxygen sensor bypass signal oscillates between about 0.0 volts and about 0.7 volts every 3 to 4 seconds when the vehicle is not in motion, and between about 0.0 volts and about 0.9 volts every 3 to 4 seconds when the vehicle is in motion.

* * * * *